United States Patent
Carlsund et al.

[11] Patent Number: 5,966,713
[45] Date of Patent: Oct. 12, 1999

[54] METHOD FOR DETERMINING THE CONTENTS OF A RESTORATION LOG

[75] Inventors: Peter Carlsund, Skärholmen; Lena Högberg; Maria Hillgren, both of Stockholm, all of Sweden

[73] Assignee: Telefonaktiebolaget LM Ericsson, Stockholm, Sweden

[21] Appl. No.: 08/990,333

[22] Filed: Dec. 15, 1997

Related U.S. Application Data

[63] Continuation of application No. PCT/SE96/00774, Jun. 13, 1996.

[30]   Foreign Application Priority Data

Jun. 15, 1995 [SE] Sweden .................................. 9502182

[51] Int. Cl.⁶ .............................................. G06F 17/30
[52] U.S. Cl. .............................. 707/200; 707/202
[58] Field of Search .................... 707/200, 202; 395/575, 707, 202

[56]   References Cited

U.S. PATENT DOCUMENTS

| | | | |
|---|---|---|---|
| 4,648,031 | 3/1987 | Jenner | 395/182.08 |
| 4,868,744 | 9/1989 | Reinsch et al. | 395/182.17 |
| 4,945,474 | 7/1990 | Elliot et al. | 395/182.14 |
| 5,155,678 | 10/1992 | Fukumoto et al. | 707/202 |
| 5,201,044 | 4/1993 | Frey, Jr. et al. | 395/575 |
| 5,280,611 | 1/1994 | Mohan et al. | 707/8 |
| 5,287,501 | 2/1994 | Lomet | 707/202 |
| 5,428,785 | 6/1995 | Morel et al. | 395/700 |
| 5,469,562 | 11/1995 | Saether | 395/182.18 |
| 5,553,279 | 9/1996 | Goldring | 395/600 |

FOREIGN PATENT DOCUMENTS

| | | |
|---|---|---|
| 0 443 872 | 8/1991 | European Pat. Off. . |
| 0 443 974 | 8/1991 | European Pat. Off. . |
| 0 516 900 | 12/1992 | European Pat. Off. . |
| 0 623 877 | 3/1994 | European Pat. Off. . |

*Primary Examiner*—Paul R. Lintz
*Assistant Examiner*—Jean Bolte Fleurantin
*Attorney, Agent, or Firm*—Burns, Doane, Swecker & Mathis, L.L.P.

[57]   ABSTRACT

Methods create restoration log records in a restoration log in a computer system which includes software and hardware resources and a data base containing software representations of the resources, which can be exposed to operations from a process associated with the data system or from an operations system for the data system. A restoration log record shall reflect an updating of a resource representation performed from the process or from the operations system. For enabling conditional creation of a log record in the restoration log in case of an operation directed towards the resource representation, each resource representation is provided with logging information indicating whether an updating of the resource representation shall be logged in the restoration log.

3 Claims, 10 Drawing Sheets

FIG. 15 ject oriented system. The resource representation can be
METHOD FOR DETERMINING THE CONTENTS OF A RESTORATION LOG This application is a continuation of International Application No. PCT/SE96/00774, filed Jun. 13, 1996, which designates the United States.

BACKGROUND

The present invention relates to a method for creating restoration log files in a restoration log in a data system that includes software and hardware resources and a data base containing software representations of the resources, said resource representations containing data in associated attributes, and being able to be exposed to operations from a process associated with the data system or from an operations system for the data system. By a restoration log file is here meant something that shall reflect a resource representation updating performed from the process or from the operations system.

All computer systems associated with a process interact with the process as well as with operators and/or other operations systems. Examples of such systems are digital telecommunication switches, supervising systems for power distribution, and different types of manufacturing support systems. All these types of systems have a software representation of resources in the process. Such a resource representation can e.g. consist of a resource object in an object oriented system. The resource representation can be affected by an updating request from the process to the system. It can also be affected by an updating request from the operator and/or other systems. Later on the software representation can be affected due to an updating request from the process as well as from the operator.

In a telecommunication system subscribers are regarded as part of the process and their invoking of services is regarded as updating requests from the process to the switch. Services created from an operations support central are regarded as updating requests from another system/operator.

Common principles for system backup are that instant copies of all resource representations in a system are created with determined intervals, said instant copies being intended to be used for reloading in case of a system crash. Thereafter a restoration log is created with all updating commands from the operations system to the system. Normally, the restoration log contains no updatings originating from the process. In certain rare cases the initiator of an updating must create a restoration log record reflecting updating of the resource representation.

If the system does not support logging from a process one disadvantage of this principle is that certain or all updatings from the process are missing or erroneous depending on how well the initiators of the updating requests have followed the rule to create a restoration log record. The agreement between the restoration log and real updatings of the resource representations depend on a correct design by the initiator. Lack of correctness may turn out to be not visible until the restoration log shall be used for restoration of the system after a crash.

Another disadvantage is that the restoration log used for restoring will contain all updating requests from the operations system although only certain of these can be of value for a restoration.

Obviously it is therefore a great risk that a restoration can result in non-agreement between resource representations and the resources in the process.

EP 516,900 describes data backup and restoration in a data process system. The object is to eliminate the disadvantage of a great and unmanageable restoration log. A backup copy is taken of at least a part of stored data when this part is available for updating. Restoration of the data base is performed by introducing the backup copy and applying updatings in the log records done after a restoration.

U.S. Pat. No. 4,648,031 relates to restart of a data system after an interruption by means of resource managers including a restoration log.

U.S. Pat. No. 4,868,744 describes a method for restarting a fault tolerant operation in a data base system without charging the system log. According to the method only a minimum amount of information is logged. All transaction oriented changes are written to the log for supporting a restoration in case of an interruption.

U.S. Pat. No. 4,945,474 discloses system restart while using a restoration log and describes restoration in a plurality of steps.

U.S. Pat. No. 5,155,678 relates to data availability in restartable data base systems. A method is presented for switch over between a backup processor and an active processor after supervising of the log records of the active processor. When the active processor fails the backup processor performs the necessary restoration process.

U.S. Pat. No. 5,280,611 describes restoration of a data base after an error while using a log.

U.S. Pat. No. 5,287,501 relates to multiple level transaction restoration in a data base system. By operation logging the data base can manage plurality level restoration with very few restrictions with regard to the timing of updatings and log record.

SUMMARY

The object of the invention is to provide a method to choose changes which shall be introduced in a restoration log so that this will contain only the restoration log records which are necessary in case of restoration of the system.

According to the invention conditional creation of a log record in the restoration log is enabled in case of an operation directed towards a resource representation by providing each resource representation with logging information indicating whether an updating of the resource representation shall be logged in the restoration log.

Each time the resource representation changes its data as a result of an updating request it will generate a suitable restoration log record. This is as well valid for updating requests from the process as from the operations system or other systems.

This implies that the resource representation itself can determine whether an updating shall be logged or not and the user need not have knowledge of this. Parts of the resource representation can be reset to default or initial values at reloading of the system and corresponding attributes shall thus not be included in restoration log records.

The result will be that the restoration log will only contain the necessary restoration log records. The restoration log can be exported together with a system version from the system and will then consist of a total backup, which can be used for restoring the resource representation into agreement with the resources in the process.

According to an advantageous embodiment the logging information includes a log indication in each attribute, in which a change caused by an operation shall be logged, and a non-log indication in each attribute that shall not be logged.

At the appearance of an operation directed towards the data base a check is performed as to whether it is the question of a data changing operation, and if this is the case log data will be prepared corresponding to the operation and the operation be executed. A check can thereafter be performed of the logging information in resource representations affected by the operation, and if this indicates that logging shall be performed the prepared log data is sent to the restoration log, otherwise it will be discarded.

If a process associated with the data system accesses the data system and no process specific knowledge is required for transforming a data base updating based upon internal identities to a message including external identities, the system at reception of an access request from the process opens an application that creates a transaction. A data base managing function creates a log data collecting function and the application sends data base operations included in the access to this. The data base managing function performs the check as to whether there is the question of data changing operations and if this is the case the data changing operations are converted from a format internal to the data base to an external format, and the converted operations are sent as log data to the log data collecting function. The data base managing function orders the log data collection function to carry out the result of the checking of the logging information. The result of the operations are returned to the application that in turn forwards it to the process.

If a process associated with the data system accesses the data system and process specific knowledge is required for transforming a data base updating based upon internal identities to a message containing external identities, the system at the receipt of an access request from the process opens an application that creates a transaction and a log data collecting function. The application sends data base operations included in the access to a data base management function and to the log data collecting function, and orders it to carry out the result of the check of the logging information. If the result implies that logging information has been found that indicates that logging shall be performed the log data collecting function sends a request to a management information function for receiving managed object knowledge of changes in the data base. The log data collecting function converts data base operations from an internal to an external format and sends the converted operations to the log. The result of the operations are returned to the application that in turn forwards it to the process.

BRIEF DESCRIPTION OF THE DRAWINGS

The invention will now be described more closely below with reference to embodiments shown on the attached drawings, on which FIGS. 1–6 are intended to generally illustrate a technical standard which can be stated to form one of the bases for and elucidate later described embodiments of the invention, wherein FIG. 1 shows an example of a telecommunication network according to TMN, FIG. 2 schematically illustrates the partition of a network element included in FIG. 1 in a management layer and a resource layer, FIG. 3 schematically illustrates an example of how an operations system supervises and controls a resource via a managed object representing the resource, FIG. 11 shows a sequence diagram corresponding to the course of events illustrated in FIG. 10, FIG. 12 schematically illustrates updating in accordance with the invention of data in a data base included in a network element from an application, in accordance with a first case, FIG. 13 shows a sequence diagram corresponding to the course of events illustrated in FIG. 12, FIG. 14 schematically illustrates updating in accordance with the invention of data in a data base included in a network element from an application, according to a second case.

DETAILED DESCRIPTION

As a first introduction to the following description of embodiments of the invention, and since these embodiments for practical reasons essentially are based upon an application of the invention in a TMN environment, a number of denominations and conceptions in this context will now initially be discussed more closely with reference to FIGS. 1–6. Use of the invention is, however, not limited to this environment, but can be said to comprise all environments based upon the international ISO standard.

Figure 1:
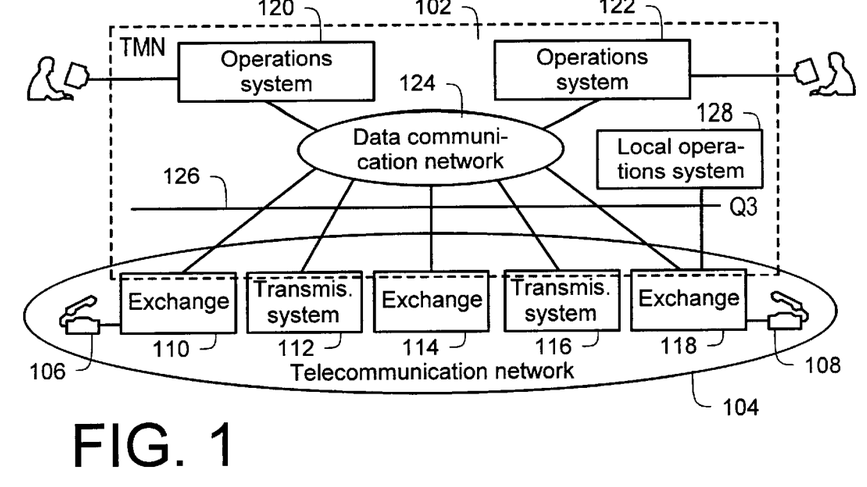

FIG. 1 schematically shows a management view 102 according to TMN for a telecommunication network 104. In the later it is indicated how two subscribers 106 and 108 are interconnected via a network element in the form of a first exchange 110, to which the subscriber 106 belongs, a first transmission system 112, an exchange 114, a second transmission system 116, and a second exchange 118, to which the subscriber 108 belongs. The management view 102 contains, besides the network elements 110–118, two operations systems 120 and 122 which via a data communication network 124 and a Q3 interface 126, communicate with the elements 110–118. A local operations system 128 communicates directly with the exchange 118 via the interface 126. Q3 is a standardized physical interface between two TMN basic blocks, such as network elements and operations systems. It consists of two parts, viz. a management protocol and a management information model visible in the interface.

The interface 126 over which the operations systems, such as 120, 122 and 128, in TMN view the telecommunication network 104 is a standardized hardware-hardware interface, wherein all types of network equipment can be supervised and controlled in the same way. The Q3 interface defines both an object oriented information model of the network elements 110–118 and the communication protocol between the operations systems 120, 122 and the network elements 110–118.

Figure 2:
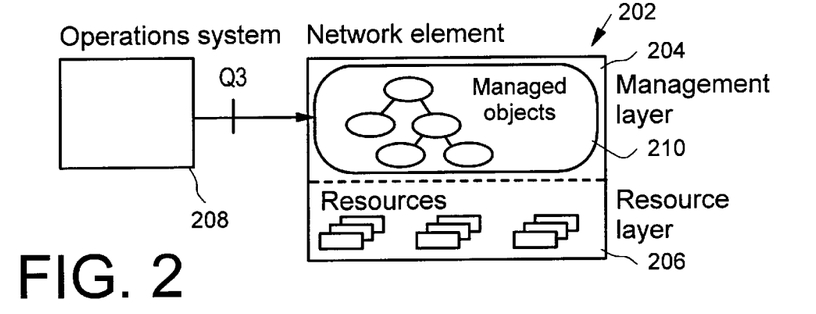

With reference to FIG. 2 a schematically illustrated network element 202 is divided into a management layer 204 and a resource layer 206. From the operations system, here designated 208, only the management layer 204 is visible. The management layer 204 consists of a group of managed objects 210 which can be supervised and controlled from the operations system 208 via the Q3 interface. A managed object realizes an interface for external management of one or more resources in a system. The managed objects 210 are selected with regard to how the network element 202 will appear to a maintenance technician. There are standardized managed objects for most applications. A maintenance technician will therefore know how network elements from different suppliers shall be controlled.

The resource layer 206 is the real implementation of the network element 202. Resources are selected to achieve the best qualities of the system. Execution time and need of memory are examples of qualities to be observed at implementation of the resource layer.

The resources in a network element are used by the traffic management. A trunk is e.g. used for carrying a call in one direction. As has already been mentioned only the management layer of the network element is systems to the operations systems. If a trunk shall be able to be managed from an operations system it must be represented by a managed object.

Figure 3:
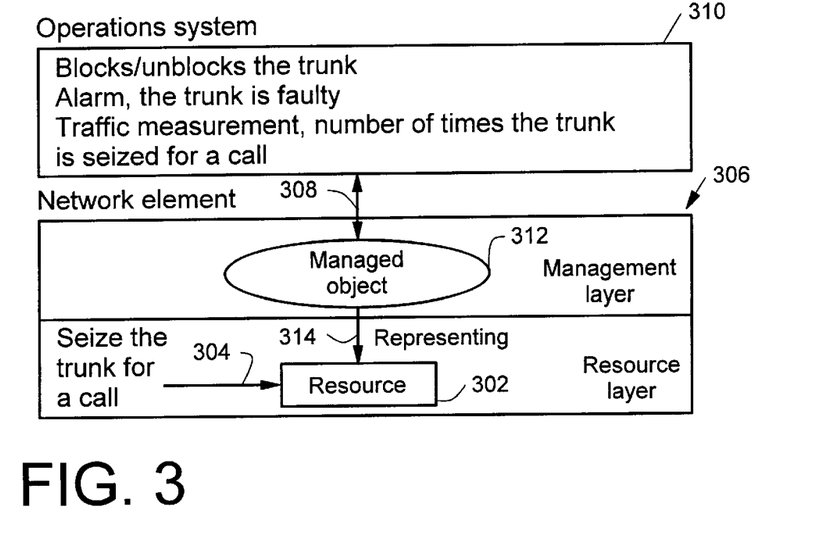

As an example FIG. 3 shows how a trunk resource object 302 is seized, arrow 304, for a call internal in a network element 306. It also shows how the resource object 302 can be supervised and controlled, arrow 308, from an operations system 310 through a managed object 312, that represents, arrow 314, the trunk resource object 302. The managed object 312 then acts as an "interface" towards the operations system. A managed object cannot store data, but all data belong to the resource objects.

Figure 4:
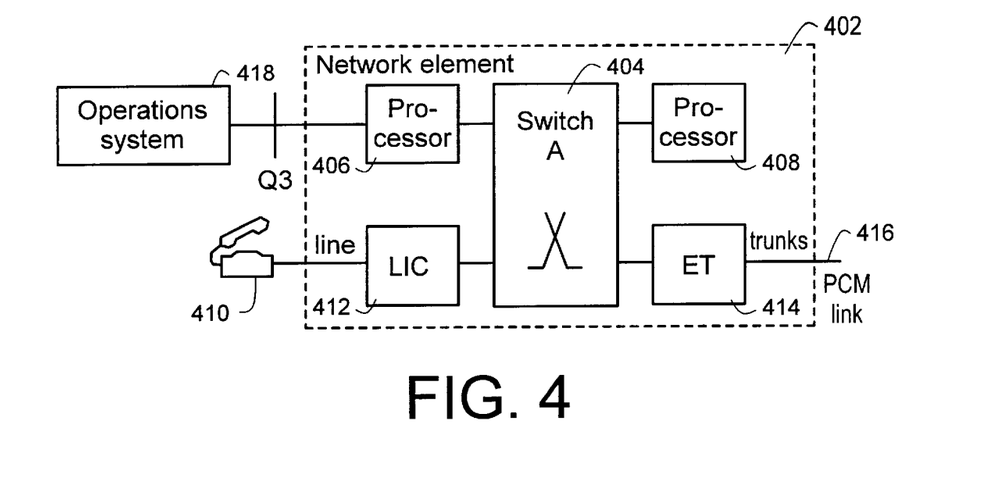
FIG. 4 shows an example of hardware included in a simple network element which can be included in the telecommunication network according to FIG. 1.

In FIG. 4 the hardware of a simple network element 402 is shown, which can here be assumed to correspond to e.g. the exchange 110 in FIG. 1. The network element 402 contains a computerized switch 404, to which two processors 406 and 408 are shown to be connected. To the computerized switch 404 a subscriber 410, which can be imagined to be the same as the subscriber 106 in FIG. 1, is furthermore connected via a subscriber line circuit 412. The network element 402 has a connection to the rest of the network via a station terminal 414, that communicates over a PCM link 416. This simple network element can be supervised and controlled from an operations system 418 connected to the processor 406 and corresponding to the operations system 120 in FIG. 1.

Figure 5:
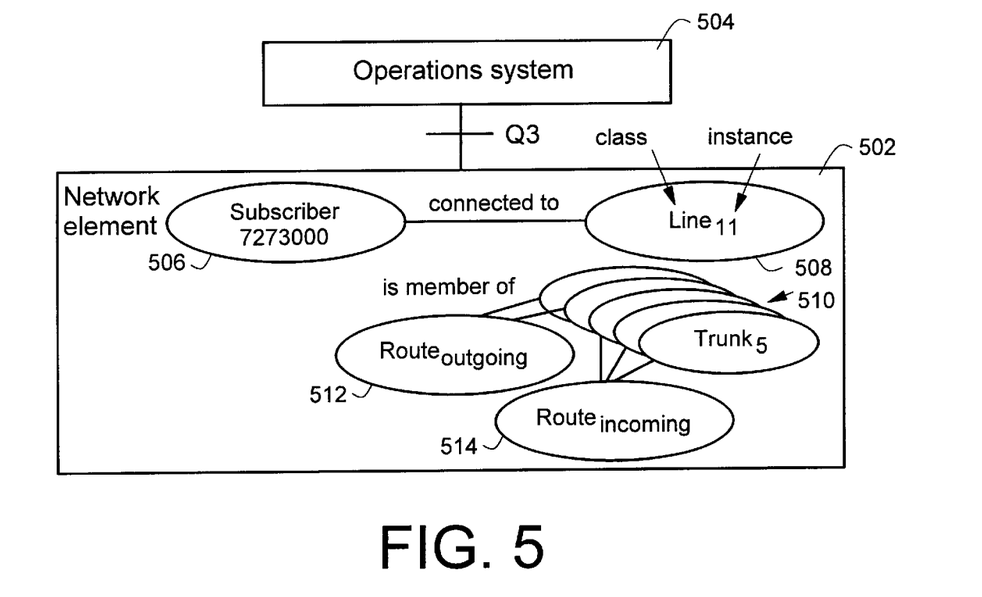
FIG. 5 shows the management layer of the network element according to FIG. 4.

In FIG. 5 only the management layer is shown of the network element in FIG. 4 and is designated 502, the operations system having obtained the designation 504. More particularly, the management layer 502 consists of managed objects which are indicated with a respective class name and instance in FIG. 5.

In the management layer 502 the subscriber 410 in FIG. 4 is represented by an instance 7273000 of an object 506 of the class Subscriber. The object 506 contains subscriber data and is connected to an instance 11 of an object 508 of the class Subscriberline containing line connection data. More particularly, this object represents the line between the subscriber and the line circuit 412 in FIG. 4. The speech channels in the PCM link 416 in FIG. 4 are represented by each an instance of an object 510 of the class Trunk. In the network element two trunks are shown to be connected to an outgoing direction, whereas three trunks are connected to an incoming direction. This is represented by an instance "outgoing" of an object 512 of a class Route, and an instance "incoming" of an object 514 of the same class, respectively. The rest of the trunks in the PCM link are not used by the network element 402.

Data of a managed object are specified as attributes. An attribute of a managed object can correspond to a permanently stored attribute of a resource object, but it can also be calculated in an algorithm catching attributes from more resource objects. Resource data can also be stored in the file system or in hardware registers. A managed object for a trunk can e.g. have the following attributes: trunkId, state, and myRoute. In this case all three attributes correspond to attributes in the same resource object.

Operations that can be performed on a managed object are:

create and delete an instance of a managed object, get and set an attribute value, action requesting a managed object to perform a task.

Actions are used when the operation is more complex than just to get or set an attribute value for a managed object. Actions include the object in its entirety, but can also indirectly include other objects.

A managed object sends a notification and informs the operations system that an event has occurred in the network element. An alarm state is an example of a notification. Notifications are used also for other purposes, e.g. loading of data and traffic statistics. When it takes a long time for performing an action, the return value at reception of "action" can inform that the action has started. Thereupon the result is sent as a notification.

Furthermore, managed objects can have associative relations to other managed objects. Trunks can e.g. comprise parts of a route. Associative relations are specified as attributes.

In the network element indicated as an example with reference to FIGS. 4 and 5 several trunks are included. All have the same attributes, actions and notifications. In object oriented terms they comprise instances of the managed object class Trunk.

The collection of all created managed object instances in a network element is denominated Management Information Base MIB. The Management Information Base is an abstract concept and shall not be mixed up with a physical data base which is used for permanently storing data in a system.

The communication between operations systems and network elements is defined in the Q3 interface. Standards recommend how to reach and work with managed objects from an operations system. Standards furthermore recommend how a managed object shall inform the operations system of events in the network element.

Figure 6:
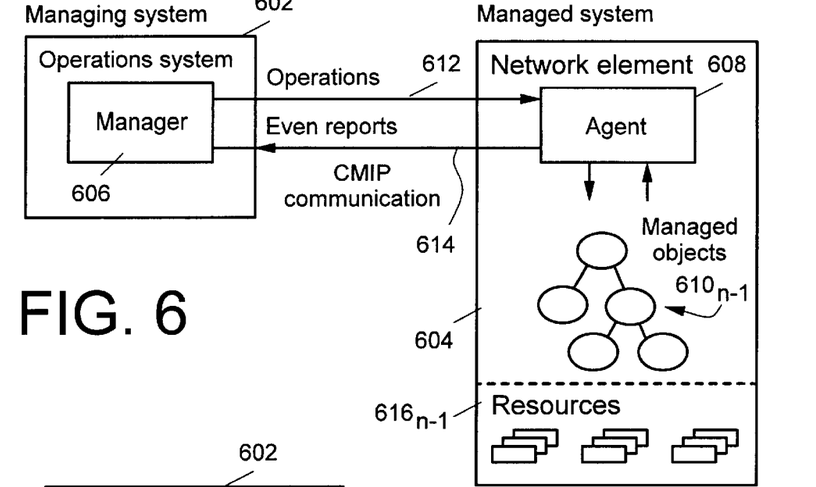
FIG. 6 is a view illustrating communication and interaction between an operations system and managed objects included in a network element, FIG. 7 schematically illustrates the connection between internal data storing in a data base in a network element and external interfaces, FIG. 8 schematically illustrates updating of data in a system according to FIG. 7 in accordance with conventional principles for creating a restoration log.

A manager in the operations system manipulates the managed objects in the network element via an operation agent function. The interaction between the manager and the agent function is shown more closely in FIG. 6. The operations system, indicated by 602 in FIG. 6, is the managing system and the network element indicated 604 is the managed system. The manager is designated 606 and the agent function 608.

The manager 606 initiates contact with the agent 608 by establishing an association to the agent. This association can be regarded as a communication link between the two systems. When the association has been established the manager and the agent can communicate with each other. The manager 606 manipulates the managed objects indicated $610_{n-1}$ by using defined operations (create, delete, set, action) indicated by an arrow 612. The managed objects 610 generate information, notifications, which can be forwarded as event reports, arrow 614, to the operations system. At $616_{n-1}$ resource objects represented by the managed objects are indicated. The operations and event reports comprise parts of a Common Management Information Service CMIS. The protocol used for the communication is designated Common Management Information Protocol CMIP, and the operations included in a current transaction are consequently designated CMIP operations.

Figure 7:
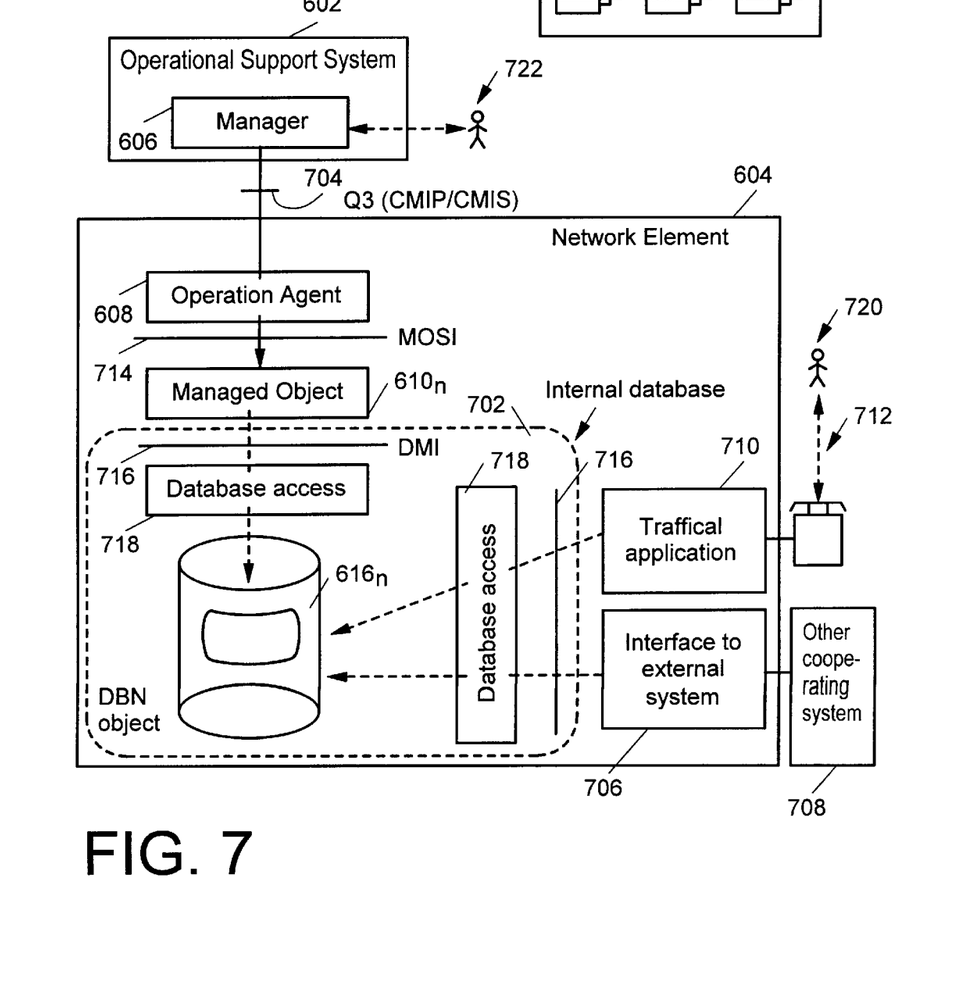

FIG. 7 is based upon FIG. 6 and elements in FIG. 7 corresponding to elements in FIG. 6 have obtained the same designations as in FIG. 6. More particularly, FIG. 7 illustrates the connection between internal data storing in a data base 702 in the network element 604 and external interfaces such as operations supports accesses, accesses from other external systems, and traffical accesses. As an example, FIG. 7 shows a Q3 interface 704 towards the operations system 602. At 706 an interface towards an external system 708 is indicated. At 710 a traffical application is indicated that is caused by a subscriber indicated at 712.

In particular, FIG. 7 illustrates the case transaction generated from the operations system 602 towards a resource in the network element 604. An operation demand is directed from the operations system 602 via the Q3 interface towards a resource object $616_n$ in the data base 702, representing the resource. The operation agent function 608 handles the communication towards the operations system 602 and finds, aided by a managed object name existing in the operations demand, and via a corresponding interface 714, in the current example also denominated Managed Object support Interface MOSI, to a managed object instance $610_n$, that represents the resource object $616_n$. The interface MOSI contains parameters for access to attributes and execution of methods in the resource object. The managed object instance $610_n$ manipulates via a generic interface 716, also denominated Data Manipulation Interface DMI, and a data base manager 718 the resource object $616_n$ in the data base 702. The data base manager 718 forms part of the operating system of the data base 702 and provides the interface 716 towards the operations system 602, as well as towards the application 710 and another system 706/708. The DMI interface shall be able to be used by all users.

Figure 8:
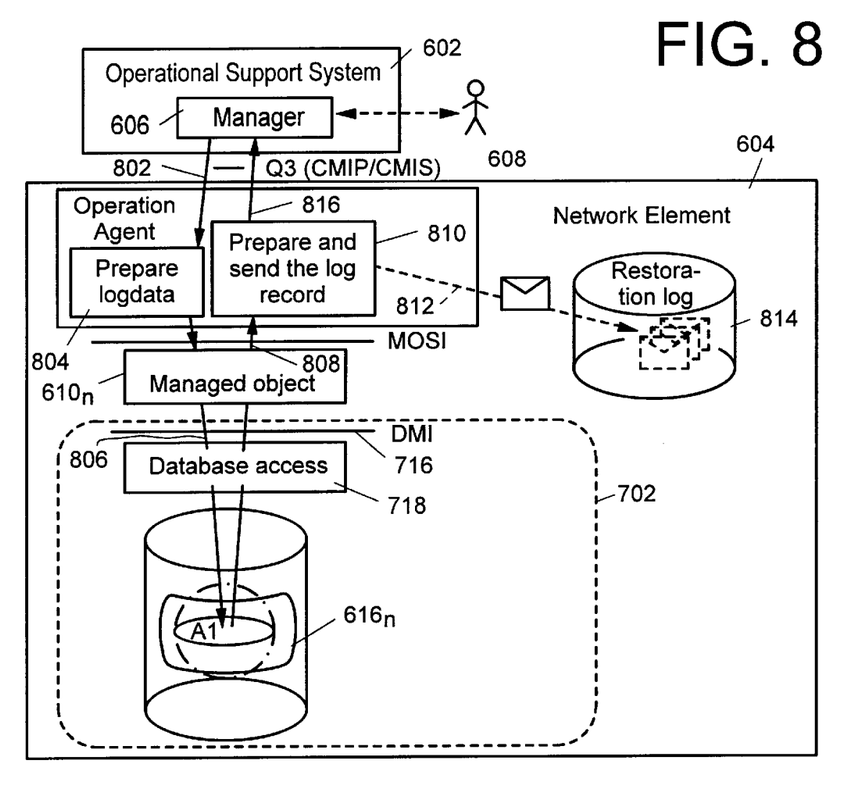

With reference to FIG. 8 updating of data of a system according to FIG. 7 according to conventional principles for creating a restoration log will be described shortly. In FIG. 8 similar elements as in FIG. 7 have obtained the same designations as in this Figure.

The operations system 602 sends an operation demand to the network element 604 according to the arrow 802. The operation agent checks the operation and creates, guided thereby, log data, block 804. The managed object $610_n$ executes the operation, arrow 806, and returns the result, arrow 808, to the operation agent 608.

The operation agent 608 prepares, according to block 810, a log record and sends it, arrow 812, to a restoration log 814. The operation agent 608 sends the result of the operation to the operations system 602 according to arrow 816.

Generally, all computer systems associated with a process interact with the process as well as with operators and/or the operations system. Examples of such computer systems are digital telecommunication switches, exemplified with the network element 604 in FIG. 7, supervision systems for power distribution, and different types of manufacturing support systems. All these types of system have, as has been mentioned earlier, a software representation of each resource in the process. In object oriented computer systems this resource representation is a resource object, such as $616_n$ in FIG. 7. The resource representation $616_n$ can be affected by an updating demand from the process to the system. It can also be affected by an updating demand from an operator, exemplified at 720 and 722 in FIG. 7, and/or other systems, such as 602 and 708 in FIG. 7. Later the resource representation can be affected due to an updating demand from the process as well as from the operator.

In a telecommunication system, subscribers, such as 712 in FIG. 7, are regarded as parts of the process and their invocation of services is regarded as updating demands from the process to the control system of the switch, such as the network element 604 in FIG. 7. Services created from an operations system, such as 602 in FIG. 7, are regarded as updating demands from another system/operator, i.e. from e.g. the system 708 in FIG. 7.

By having a so-called version management of computer systems an operator and programmed functions can get information regarding the system history. Version management supports selection and reloading of a system version. It also points to a log describing the changes of the system version.

More particularly, a system version is a complete description of information required for loading and starting a computer system, that is described by the version. To the system version a restoration log is connected that contains transactions directed towards a restoration domain comprised by the restoration log. This domain is defined in a way that only transactions which in their entirety are directed towards the domain are possible. The restoration log is used at restoration, by which is meant reloading of a system with reloading information for repeating no, certain or all operations included in the log.

A system version comprises software, data base schemes, configuration data and data base contents. The three first mentioned are unchanged over the whole system generation except for procedures intended to make changes in these, e.g. for system upgrading. Such procedures are always started with an informative record in the restoration log and is always ended by a new system version being created. The data base contents is changed over the lifetime of the system generation. Changes are stored in the restoration log. Backup of the data base contents that is added to the version management gives rise to a new system generation.

A group of system versions having the same set of software, data base schemes and configuration data are denominated system generation. The system versions form a history of the system generation. A new system generation is generated at loading/reloading of a system and at an ended procedure for changing software, data base schemes and/or configuration data.

Regular data backup contributes to maintaining robustness of a data system. The operator has the possibility to select backup intervals at plant configuration or in operation. By backup is here meant archive backup, i.e. backup stored on a secondary memory.

Backup time points and intervals are stored in a managed object in the form of a backup scheme. In the backup scheme there is also an outsorting method indicated. Only a small amount of archive copies are stored locally. Part of other, older copies are transferred to an operations support node.

Figure 9:
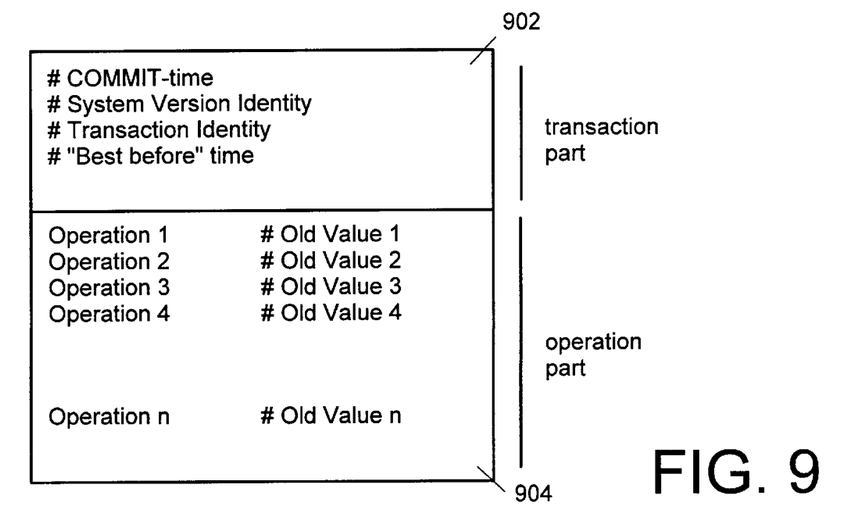
FIG. 9 is logical description of log data of a transaction, FIG. 10 schematically illustrates updating according to the invention of data in a data base included in a network element from an external operational operations system.

Referring to FIG. 9 a restoration log record consists of two parts, viz. a static transaction part 902, consisting of informations common to transactions, and a dynamic operation part 904, that can consist of an arbitrary number of operations.

The following attributes may appear in the restoration log record:

COMMIT time: states when the transaction was ended in the data base.

SystemversionIdentity: identity of the latest created system version.

TransactionIdentity: states the identity of the transaction.

"Best before" time: indicates how long the transaction is valid and is used at reading of the restoration log in a way that only transactions are read, the best before time of which has not been passed. If the transaction e.g. corresponds to an ordered alarm call, this transaction is valid until the call has been performed.

Old value: indicates the value possessed by an attribute before the operation was performed. It should be observed that the new value, if any, of an attribute is available in a current operation.

Figure 10:
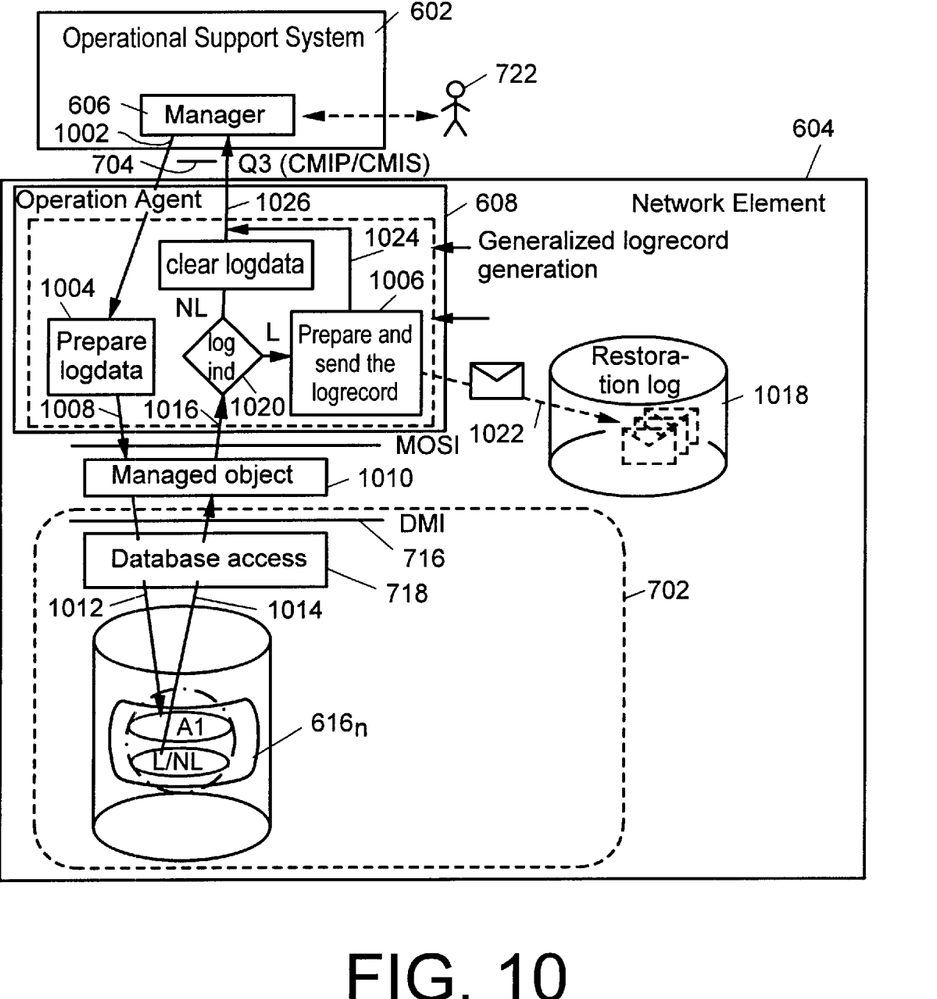
Figure 11:
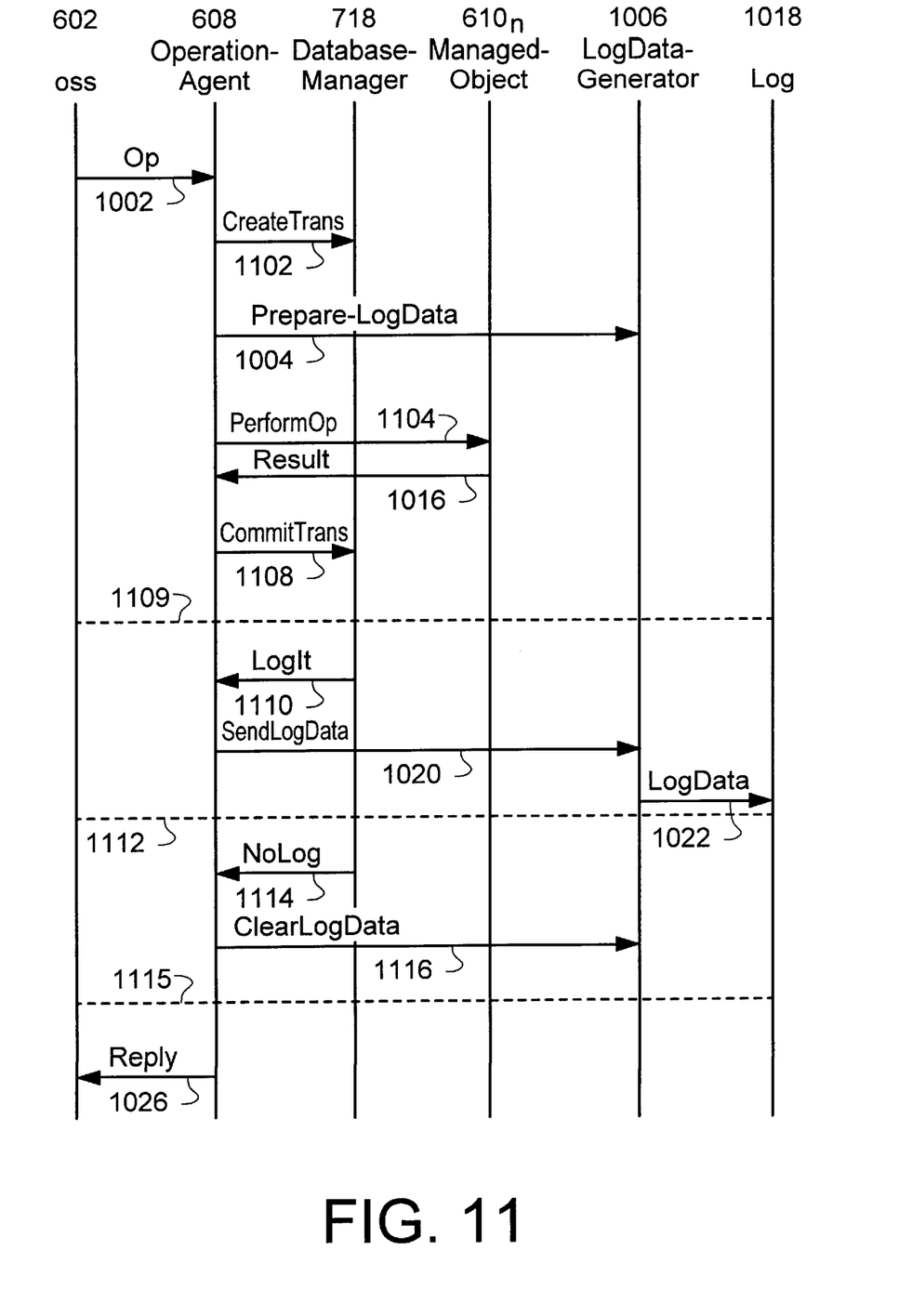

In FIG. 10 there is illustrated in a similar view as in FIGS. 7 and 8 the principle for creating a restoration log based upon a log marking in in association with each attribute, and at a transaction generated from the operations system. The same elements as in FIGS. 7 and 8 have been given the same reference characters. In FIG. 11 a corresponding sequence diagram is shown.

In FIG. 10 the resource object $616_n$ is indicated as containing an attribute A1 that can have an indication L or NL, which is intended to stand for LOG and NOLOG, respectively. The indications L and NL imply that the attribute A1 shall be logged and nologged, respectively in case of changing the attribute.

The operations system 602 sends an operation demand to the operation agent 608 in the network element 604 according to arrow 1002. The operation agent 608 creates a transaction directed towards the data base handler 718 according to arrow 1102.

The operation agent checks whether it is the question of a data changing operation. If this is the case the operation agent 608 sends the operation, with an instruction 1004 to prepare log data, to a log data generator 1006 created by the data base handler 718 when receiving the transaction. The log data generator 1006 performs this by copying the operation.

The operation agent 608 orders by the instruction 'PerformOp' according to arrow 1104 the managed object 1010 to execute the operation. The managed object 1010 calls a Data Object Agent DOA in the DMI interface 716, via which the operation is executed, arrow 1012. The managed object 1010 obtains the result and forwards it to the operation agent 608 according to arrow 1016.

The operation agent 608 commits the transaction, i.e. orders by 'CommitTrans' according to arrow 1108 the data base manager 718 to perform the transaction operation used for indicating that the transaction has been ended and that its consequenses shall remain. The result of the operation is now visible in the network element 604.

Either one of two cases is now conceivable, viz. that a log triggering attribute in the resource object $616_n$ has been changed or not changed, respectively, by the operation. The appearance of the first case in FIG. 11 is marked with a dashed line 1109.

In the first case the data base manager 718 instructs by 'LogIt', arrow 1110, the operation agent 608 to send log data to the restoration log indicated by 1018.

The operation agent 608 orders the log data generator 1006 by the instruction 'SendLogData', arrow 1020, to send log data to the restoration log 1018. The log data generator 1006 performs this according to arrow 1022. The operation has thereby been logged. The log data generator 1006 reports back according to arrow 1024 to the operation agent 608.

In the second case, the appearance of which in FIG. 11 is marked by a dashed line 1112, the data base manager 718 by 'NoLog' may have reported back to the operation agent 608 that no log trigging attribute has been affected, arrow 1114 in FIG. 11. The operation agent 608 then orders the log data generator by 'ClearLogData', arrow 1116 in FIG. 11, to discard the operation log data prepared in accordance with the above.

A dashed line 1115 indicates that that following thereupon in FIG. 11 is common to both cases. For both alternatives the operation agent thus according to arrow 1026 returns the result of the operation in 'Reply' to the operations system 602.

With reference to two cases illustrated in FIGS. 12 and 13, and in FIGS. 14 and 15, respectively, general principles will now be described for creating according to the invention a restoration log in case of updatings towards a data base from a traffic application. For the sake of simplicity it is assumed that there is the question of the same data base and the same network element in FIGS. 12 and 14 as in FIG. 10. Corresponding elements as in FIG. 10 have therefore in FIGS. 12 and 14 obtained the same reference characters as in FIG. 10.

In both cases there is the question of a process that does not perform operations towards the resource representations of the data base via managed objects with external identities, but via internal data base identities reciding in the DMI interface 716. Since restoration of the data base from a restoration log must be performed via the management view of the operations system, not shown in FIGS. 12 and 14 for the sake of simplicity, i.e. via managed objects, log data reciding in the restoration log must have the external format. The format of the internal identities included in the operation must therefore before logging be transformed to an external format.

Figure 12:
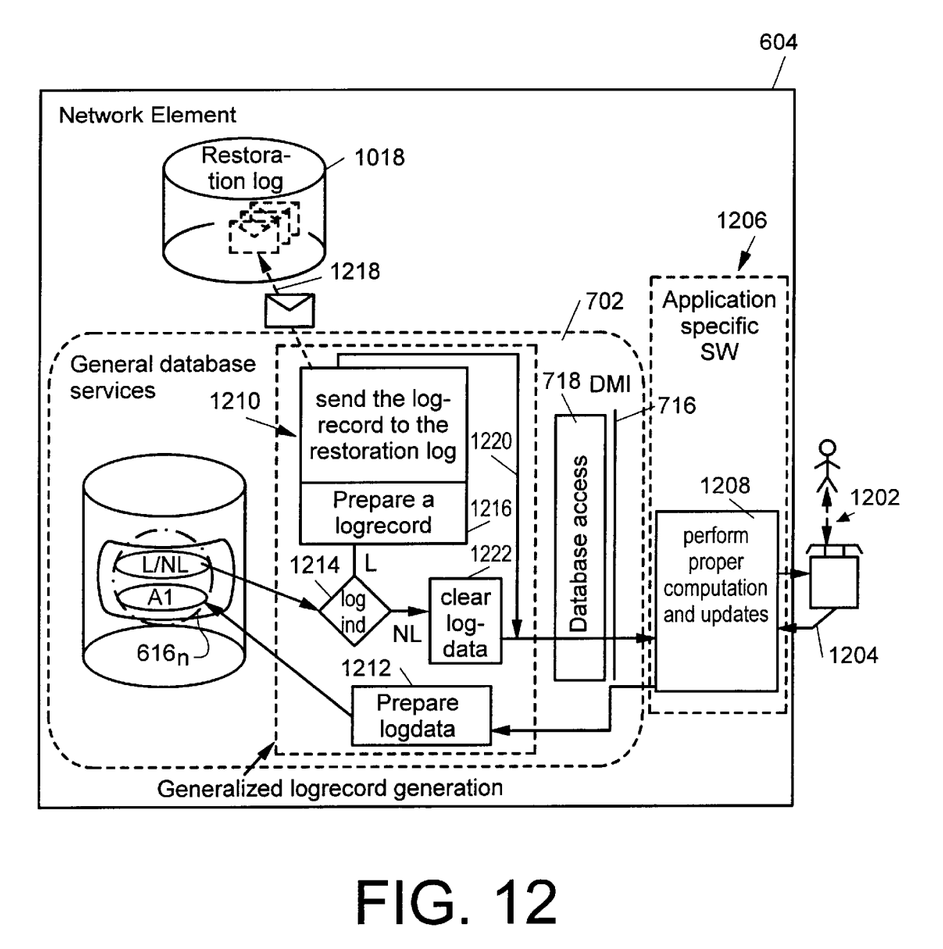
Figure 13:
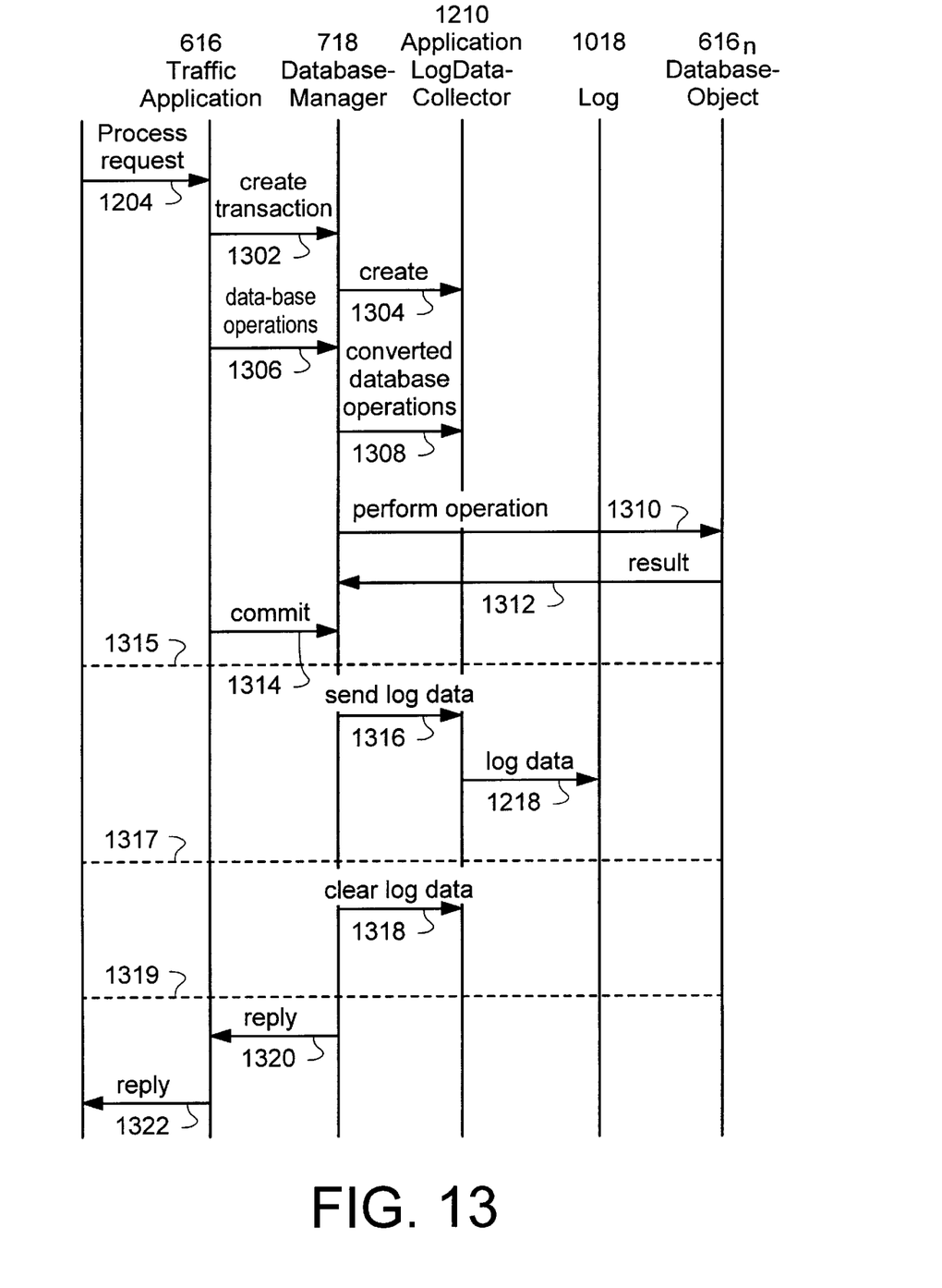

In the case according to FIGS. 12 and 13 it is presumed that the access functions of the data base 702 can design a CMIP message without having specific knowledge about the semantics for a specific managed object, while using only syntax knowledge. In practice this implies that the only real conversion that is done is that internal identities are converted to external ones by means of general translating functions. The advantage is that the traffical application need not be equipped with specific functions for creating and sending log records to the restoration log.

With reference to FIGS. 12 and 13 a process caused by a telephone subscriber indicated at 1202 sends an operation demand 1204 to the network element 604. The network element 604 is presupposed to contain application specific software, indicated by a block 1206, below shortly denominated application, with information of a specialized character for being able to take care of the operation demand and resulting courses of events described more in detail below. By a block 1208 in the application 1206 functionality is indicated for performing suitable calculation and updatings for these courses of events.

The application 1206 creates a transaction directed, arrow 1302, towards the data base manager 718. The data base manager 718 creates, arrow 1304, a log data collector 1210. The traffic application 1206 sends data base operations, arrow 1306, to the data base manager 718. The data base manager 718 checks whether there is the question of data changing operations or not. If this is the case log data are prepared, indicated by a block 1212, by transforming the data changing operations from the internal to the external format, and the converted operations are sent, arrow 1308, to the log data collector 1210.

The data base manager 718 sends an instruction 'perform operation', arrow 1310, to affected data base objects, exemplified by the object 616ₙ, to perform the operation. The data base object executes the operations and returns the result, arrow 1312, to the data base manager 718. The traffic application 1206 commits the transaction, i.e. orders the data base manager 718, arrow 1314, to perform the transaction operation used for indicating that the transaction has been ended and that its consequences shall remain.

A check is made, indicated at 1214, of whether some log trigging attribute in a data base object has been changed by the operations in the transaction. As in FIG. 11 either one of two possible cases will appear, viz. that such a log trigging attribute has been found or not found, respectively. The appearance in FIG. 13 of the first case is indicated by a dashed line 1315. In this case the data base manager 718 instructs by 'send log data', arrow 1316, the log data collector 1210 to create a log record of the two prepared log data, indicated by a block 1216, and to send this to the restoration log 1018. The log data collector 1210 performs this according to arrow 1218. As has appeared from the above this implies that operations are logged on the external format. The log data collector 1210 reports back according to arrow 1220 to the data base manager 718.

The appearance of the second case is indicated in FIG. 13 with a dashed line 1317. If the check 1214 shows that no log trigging attribute has been affected, the data base manager 718 according to arrow 1318 instructs the log data collector 1210 by the instruction 'ClearLogData', block 1222, to discard the prepared log data.

By a dashed line 1319 it is indicated that that following thereupon in FIG. 13 is common to both cases. For both alternatives the data base manager 718 thus then returns the result of the operations to the application 1206, that forwards it to the process, cf. arrows 1320 and 1322, respectively.

Figure 14:
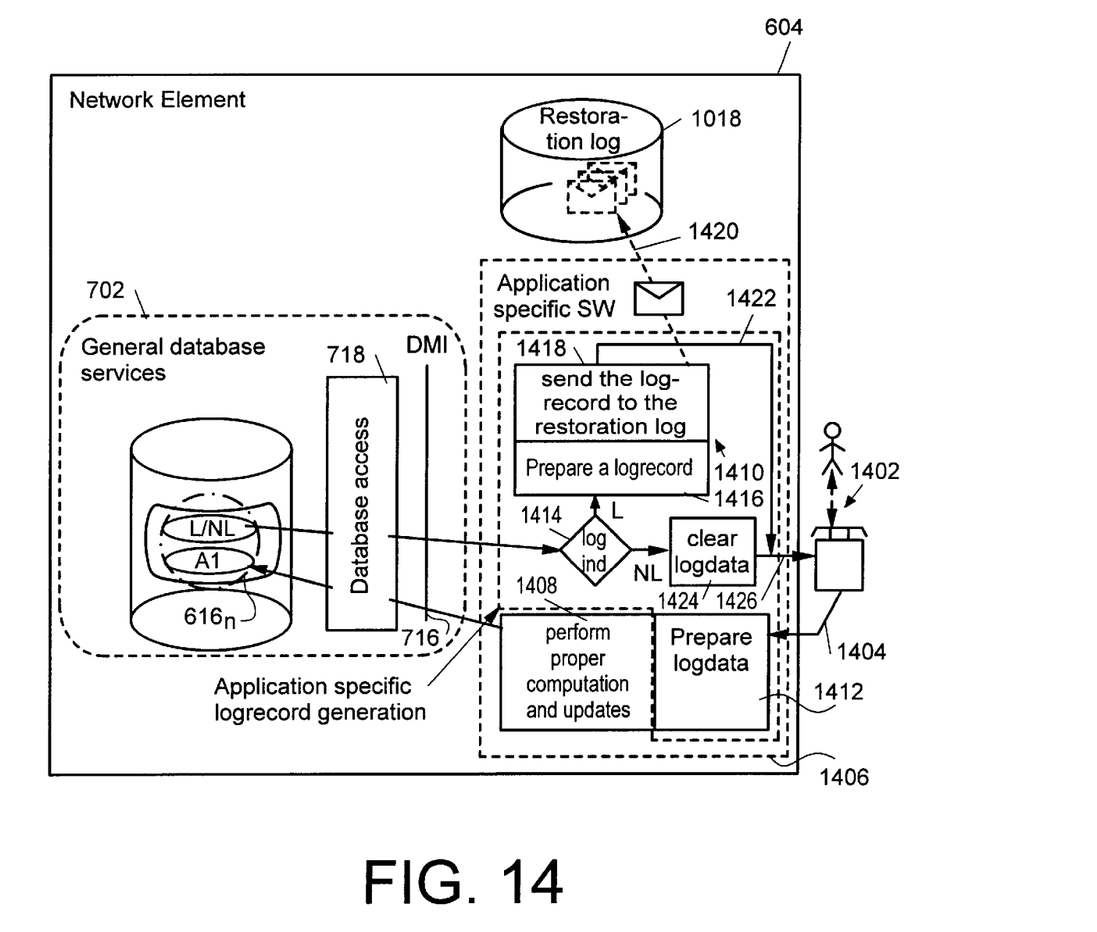
Figure 15:
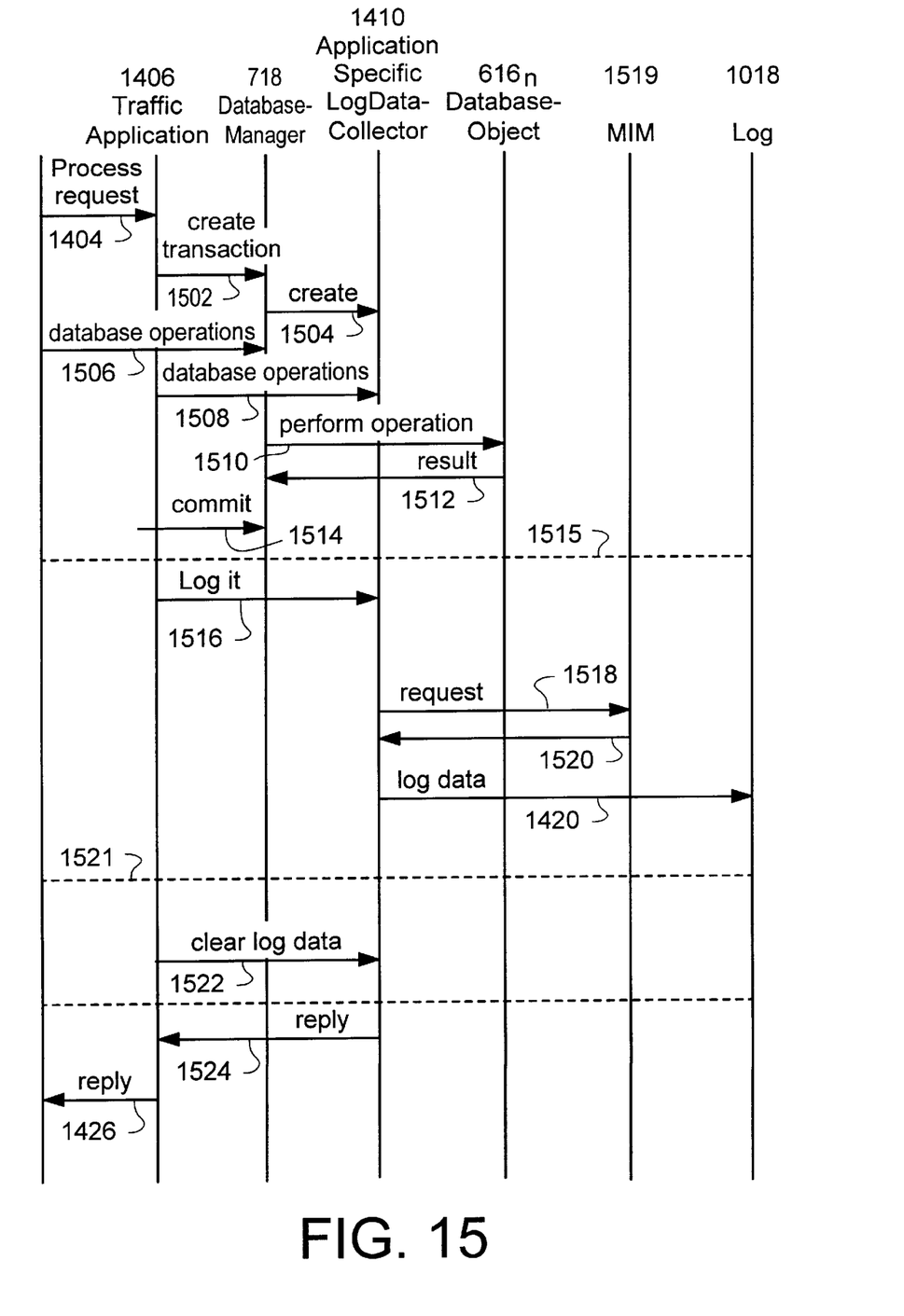
FIG. 15 shows a sequence diagram corresponding to the course of events illustrated in FIG. 14.

The case according to FIGS. 14 and 15 presupposes, contrary to the case according to FIGS. 12 and 13, that application specific knowledge is required for transforming a data base updating based upon internal identities to a CMIP message with external identities. General translation between internal data base identities and external identities is thus not possible.

A process caused by a telephone subscriber indicated at 1402 sends an operation demand 1404 to the network element 604. As in the case according to FIGS. 12 and 13 the network element 604 is presupposed to contain application specific software, indicated by a block 1406, below shortly denominated application, with information of a specialized character to be able to take care of the operation demand and courses of events resulting therefrom and described more closely below. With a block 1408 in the application 1406 functionality is indicated for performing suitable calculation and updatings for these courses of events. The application 1406 creates a transaction directed, arrow 1502, towards the data base manager 718, and a log data collector 1410, arrow 1504. The application 1406 sends data base operations to the data base manager 718, arrow 1506, and to the log data collector 1410, arrow 1508.

The data base manager 718 sends an instruction 'perform operation', arrow 1510, to associated data base objects, exemplified with the object 616ₙ to perform the operation. This instruction also includes an instruction, indicated with a block 1412, to prepare log data. The data base object executes the operations and returns the result, arrow 1512, to the data base manager 718. The application 1406 commits the transaction, i.e. orders the data base manager 718, arrow 1514, to perform the transaction operation, that is used for indicating that the transaction has been ended and that its consequences shall remain.

A check is made, indicated at 1414, of whether some log trigging attribute in an object has been changed by the operations in the transaction. As in FIGS. 11 and 13 two cases now appear, viz. that the log trigging attribute has been changed or not changed, respectively. In FIG. 15 the appearance of the first case is indicated by a dashed line 1515. In this case the application 1406 instructs by 'log it', arrow 1516, the log data collector 1210 to create a log record, indicated by block 1416, and to send this, indicated by block 1418, to the restoration log 1018. The log data collector 1410 then sends a demand, arrow 1518, to a class specific auxiliary function 1519, that in the form of a management information model provides a description of existing managed object classes, to obtain managed object specific information regarding changes in the data base 702. The auxiliary function 1519 in question can be of the kind more closely described in the Swedish patent 470.456. The log data collector 1410 obtains the requested information according to arrow 1520. By means thereof the log data collector 1410 transforms the data base operations from an internal to an external format and sends the converted operations to the log according to arrow 1420. The log data collector 1410 reports back according to arrow 1422, to the application 1406.

The appearance of the second case is indicated in FIG. 15 with a dashed line 1521. If the check 1414 thus shows that no log trigging attribute has been affected, the application 1406 instructs, arrow 1522, the log data collector 1410 by 'ClearLogData', block 1424, to discard the collected operations.

For both alternatives the log data collector 1410, returns, arrow 1524, the result of the operations to the application 1406, that forwards it to the process, arrow 1426.

What is claimed is:

1. A method for creating restoration log records in a restoration log in a data system, that comprises software and hardware resources and a database containing software representations of the resources, said resource representations containing data in associated attributes, and being exposable to operations via a managing function from a process associated with the data system or from an operations system for the data system, wherein a restoration log record shall reflect an updating of a resource representation that is performed from the process or from the operations system, comprising the step of:
        to enable conditional creation of a log record in the restoration log in case of an operation directed via the managing function towards a resource representation, providing each resource representation with logging information informing whether an updating of the resource representation shall be logged in the restoration log, said logging information including a log indication in each attribute for indicating logging in case an operation shall be logged and for indicating non-logging in case an operation shall not be logged, wherein the managing function at appearance of an operation
        checks whether there is the question of a data changing operation and if this is the case
            prepares log data corresponding to the operation,
            executes the operation,
            checks the log indication of each attribute of resource representations affected by the operation, and if the log indication indicates that logging shall be performed the prepared log data of said each attribute is sent to the restoration log, otherwise the prepared log data of the attribute is discarded.

2. A method according to claim 1, in which a process associated with the data system accesses the data system and there is no process specific knowledge required for transforming a database updating based upon internal identities wherein to a message containing external identities,     the system when receiving an access demand from the process opens an application that creates a transaction,     the managing function creates a log data collecting function,     the application sends database operations included in the access to the managing function,     the managing function performs the check of whether there is the question of data changing operations and if this is the case, the data changing operations are converted from a format internal to the database to an external format, and the converted operations are sent as log data to the log data collecting function,     the managing function orders the log data collecting function to perform the result of the check of the log information,     the result of the operations is returned to the application that in turn forwards it to the process.

3. A method according to claim 1, in which a process associated with the data system accesses the data system and there is required process specific knowledge for transforming a database updating based upon internal identities to a message containing external identities, wherein     the system when receiving an access demand from the process opens an application that creates a transaction and a log data collecting function,     the application sends database operations included in the access to the managing function and to the log data collecting function,     the application orders the log data collecting function to carry into effect the check of the logging information,     if the result implies that logging information is found that indicates that logging shall be performed the log data collecting function sends a demand to a management information function for obtaining managed object knowledge about the changes in the database,     the log data collecting function transforms the database operations from an internal to an external format and sends the converted operations to the log,     the result of the operations is returned to the application that in turn forwards it to the process.

\* \* \* \* \*